(12) United States Patent
Steiner et al.

(10) Patent No.: US 12,725,815 B2
(45) Date of Patent: Sep. 1, 2026

(54) ELECTRICAL ENERGY SUPPLY SYSTEM FOR MOBILE PLATFORMS AND VEHICLE HAVING AN ELECTRICAL ENERGY SUPPLY SYSTEM

(71) Applicant: Airbus (S.A.S.), Blagnac (FR)

(72) Inventors: Gerhard Steiner, Mindelheim (DE); Christian Wehle, Schliersee (DE); Florian Vogel, Unterhaching (DE); Jürgen Steinwandel, Uhldingen-Mühlhofen (DE); Michael Hofmann, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 1034 days.

(21) Appl. No.: 17/846,802

(22) Filed: Jun. 22, 2022

(65) Prior Publication Data

US 2022/0416275 A1 Dec. 29, 2022

(30) Foreign Application Priority Data

Jun. 23, 2021 (EP) .................................... 21181179

(51) Int. Cl.
*H02J 1/10* (2026.01)
*B60L 50/70* (2019.01)
(Continued)

(52) U.S. Cl.
CPC ... *H01M 8/04567* (2013.01); *H01M 8/04559* (2013.01); *H01M 8/0488* (2013.01);
(Continued)

(58) Field of Classification Search
CPC .......... H01M 8/04567; H01M 8/04559; Y02E 60/50; H02J 1/06; H02J 2310/44;
(Continued)

(56) References Cited

U.S. PATENT DOCUMENTS 10,320,015 B1 * 6/2019 Burke .................. H01M 8/241
2003/0113594 A1 * 6/2003 Pearson ........... H01M 8/04626 320/101

(Continued)

FOREIGN PATENT DOCUMENTS

DE 10 2011 087015 A1 5/2013
DE 10 2014 203159 A1 8/2015

OTHER PUBLICATIONS

European Search Report for Application No. 21181179 dated Dec. 9, 2021.

*Primary Examiner* — Rexford N Barnie
*Assistant Examiner* — Rasem Mourad
(74) *Attorney, Agent, or Firm* — KDW Firm PLLC

(57) ABSTRACT

An electrical energy supply system for mobile platforms includes an electrical arrangement having at least two fuel cell units in a serial interconnection in relation to one another in the electrical arrangement and configured to provide an electrical voltage to supply at least one consumer. The electrical energy supply system includes a ground unit which is assigned an electrical reference potential, and at least two control units, which are each assigned to at least one of the fuel cell units, wherein each of the at least two control units is configured to detect an electrical voltage of the assigned fuel cell unit in relation to the reference potential. An aircraft is disclosed having an electrical energy supply system.

20 Claims, 5 Drawing Sheets

(51) Int. Cl.
*B60L 58/30* (2019.01)
*H01M 8/04537* (2016.01)
*H01M 8/04858* (2016.01)
*H02J 105/30* (2026.01)

(52) U.S. Cl.
CPC ........... *H02J 1/10* (2013.01); *H01M 2250/20* (2013.01); *H02J 2105/32* (2026.01)

(58) Field of Classification Search
CPC ...... H02J 2300/30; B60L 50/70; B60L 58/30; B64D 27/355; B64D 27/357
See application file for complete search history.

(56) References Cited

U.S. PATENT DOCUMENTS

| | | | | |
|---|---|---|---|---|
| 2006/0051634 | A1* | 3/2006 | DeVries | H01M 8/04559 429/432 |
| 2008/0150356 | A1 | 6/2008 | Breit et al. | |
| 2010/0040931 | A1* | 2/2010 | Hortop | H01M 8/2475 429/440 |
| 2013/0134776 | A1* | 5/2013 | Luecken | H02J 1/08 307/9.1 |
| 2015/0244277 | A1* | 8/2015 | Wangemann | H02M 3/1582 307/9.1 |

* cited by examiner

ELECTRICAL ENERGY SUPPLY SYSTEM FOR MOBILE PLATFORMS AND VEHICLE HAVING AN ELECTRICAL ENERGY SUPPLY SYSTEM

CROSS-REFERENCE TO RELATED APPLICATION

This application claims priority to EP 21181179.9 filed Jun. 23, 2021, the entire disclosure of which is incorporated by reference herein.

TECHNICAL FIELD

The disclosure herein relates to electrical energy supply systems based on fuel cells. In particular, the disclosure herein relates to an electrical energy supply system for mobile platforms and an aircraft having such an electrical energy supply system.

BACKGROUND

Fuel cell systems are gaining more and more importance presently, in particular with regard to drive systems for mobile platforms. Such fuel cell systems, for example PEM (polymer electrolyte membrane) fuel cells, have a voltage level up to approximately 400 V as individual modules. This is, inter alia, related to manufacturing and is dependent on the number of individual cells which can typically be integrated in a fuel cell module. In this case, the number of the individual cells defines the voltage of the module. PEM fuel cells, which can be provided in the form of so-called individual stacks, typically provide electrical powers of approximately 30 to 50 kW. They can be combined via a parallel interconnection for higher powers. The voltage level is that of the individual stack here. If higher voltage levels are required, in automotive applications, a DC/DC converter is used, which then provides the higher operating voltage. Higher operating voltages are necessary to keep the current load as a whole at a given input power and the volume and weight of the electrical drive motors as low as possible.

SUMMARY

It is an object of the disclosure herein to provide an improved electrical energy supply system based on fuel cells.

This object is achieved by the disclosure herein. Example embodiments are set forth in the following description.

According to one aspect of the disclosure herein, an electrical energy supply system for mobile platforms, for example vehicles, is specified. The electrical energy supply system comprises an electrical arrangement having at least two fuel cell units, which are provided in a series interconnection in relation to one another in the electrical arrangement and are embodied or configured to provide an electrical voltage for supplying at least one consumer. The electrical energy supply system furthermore comprises a ground unit which is assigned an electrical reference potential, and at least two control units, which are each assigned to at least one of the fuel cell units, wherein each of the at least two control units is embodied to detect an electrical voltage of the assigned fuel cell unit in relation to the reference potential.

The energy supply system according to the disclosure herein can be used on mobile platforms or in mobile applications. Such mobile platforms are, for example, vehicles, such as ground vehicles, aircraft, water vehicles, etc.

The electrical energy supply system according to the disclosure herein represents a possibility for providing a serial interconnection of individual fuel cell units or so-called fuel cell stacks to increase voltage, with special consideration of the requirements upon use in the aviation sector. Since very high drive powers are required in particular in the aviation sector in comparison to the automotive sector, an increase of the system voltage receives a greater priority. The resulting currents and the power-to-weight ratios of the system can be kept comparatively low by the electrical energy supply system described herein.

Furthermore, examples of the disclosure herein provide a possibility for keeping voltages in relation to a reference potential as low as possible, in order to take into consideration the great usage height of aircraft and thus the air pressure-dependent breakdown voltage. Emergency operation in case of a fault can also be ensured by the electrical energy supply system and a simple combined operation together with further energy stores can be provided. The electrical energy supply system enables the use of additional electronics for increasing voltage, that is to say a DC/DC converter (direct-current/direct-current converter), to be avoided.

As mentioned, the electrical energy supply system has an electrical arrangement having at least two fuel cell units. The fuel cell units, which are also referred to here as so-called fuel cell stacks, can each comprise one or more fuel cells, for example PEM (polymer electrolyte membrane) fuel cells. The at least two fuel cell units are arranged in series in the electrical arrangement here, that is to say in a serial interconnection, within the electrical energy supply system. In other words, the at least two fuel cell units are connected in series. An arbitrary number of fuel cell units can be connected in series for this purpose.

The fuel cell units deliver an electrical voltage to supply at least one consumer. The consumer can be a drive unit, in particular one or more drive motors or electric motors, of the mobile platform. The drive motor can acquire its AC voltage power, for example, via an inverter, which transforms the DC voltage of the fuel cell units into a settable AC voltage, which is also variable depending on configuration, having selectable output frequency which is also variable depending on the embodiment. The settable voltage and the variable frequency can be used here for the speed control of the electric drive motor or motors. It is also possible to operate the inverter in generator mode to recuperate braking energy arising in the electric motor and subsequently supply it to a traction battery provided in the electrical arrangement.

A ground unit is provided for the electrical energy supply system, wherein the ground unit is assigned an electrical reference potential. The ground unit can be, for example, an electrically conductive primary structure element of the mobile platform to which a zero potential is assigned, which is used as the reference potential for the electrical arrangement.

As mentioned, the electrical energy supply system has at least two control units, which are each assigned to at least one of the fuel cell units. A first control unit of the at least two control units can be assigned, for example, to a first fuel cell unit of the at least two fuel cell units or can be electrically and/or communicatively coupled thereto, while a second control unit of the at least two control units can be assigned to a second fuel cell unit of the at least two fuel cell units or can be electrically and/or communicatively coupled thereto. It is possible that one or more of the at least two control units are each assigned to multiple fuel cell units or are electrically and/or communicatively coupled thereto.

Each of the at least two control units is embodied to detect an electrical voltage of the assigned fuel cell unit in relation to the reference potential, for example a zero potential. Furthermore, it is possible that each of the at least two control units is embodied to regulate an electrical voltage of the fuel cell unit assigned thereto in relation to the reference potential. Such a regulation can take place here in such a way that the total power delivered by the fuel cell units is distributed as uniformly as possible on the at least two fuel cell units. For example, the regulation can take place in such a way that the fuel cell units discharge essentially equal amounts of electrical power into the electrical arrangement and provide it to the consumer.

A communication and control can take place with respect to the reference ground or the reference potential. In particular, it is advantageous to relate the control and regulation of the fuel cell units and possibly provided auxiliary units such as turbine, fan, pump, etc. to this reference potential in order to avoid a potential isolation, which is otherwise required.

According to one embodiment, the electrical energy supply system does not comprise any power electronics in addition to the fuel cell units, and in particular does not comprise a DC/DC converter, to increase an electrical voltage provided by the fuel cell units.

This can mean that in the above-described series interconnection of the at least two fuel cell units for voltage increase, the necessity of additional power electronics, for example DC/DC converter, is reduced to coupling on additional energy stores, such as accumulators, capacitors, or so-called supercaps (supercapacitors). In particular to keep the system weight low at a given power demand and to achieve the highest possible level of reliability, it is advantageous to dispense with power electronics for increasing the system voltage, as is the case, for example, with a parallel interconnection of fuel cells, and to provide the most direct possible power flow.

According to one embodiment, the at least two control units are each embodied to regulate the electrical voltage of the assigned fuel cell units in relation to the reference potential. This regulation can take place in such a way that the electrical powers respectively provided by the fuel cell units are essentially equal.

A control unit can thus, for example, regulate or control an electrical voltage or a voltage increase at the fuel cell unit assigned thereto in order to thus regulate the electrical voltage provided by this assigned fuel cell unit at the consumer individually and independently of a provided electrical voltage of a further fuel cell unit. In one preferred case, the control units regulate the electrical voltages of the fuel cell units assigned to them so that the delivered power is distributed as uniformly as possible on the fuel cell units.

According to one embodiment, the fuel cell units are provided in a symmetrical interconnection in relation to the ground unit, so that a first voltage difference between a first fuel cell unit of the at least two fuel cell units and the reference potential is equal or essentially equal to a second voltage difference between a second fuel cell unit of the at least two fuel cell units and the reference potential.

The reference potential for the fuel cell units is the ground unit or ground. The fuel cell units are interconnected symmetrically in relation to the ground unit in this case. This type of interconnection minimizes the voltages occurring in relation to the ground unit and at the same time ensures a high system voltage.

In other words, the reference potential is coupled on at a point between the at least two fuel cell units in the electrical arrangement. The term “symmetrical” is to be understood here in the meaning of “electrically symmetrical”. This relationship is explained in more detail in the description of the figures. Such an electrically symmetrical interconnection is advantageous since in this case the maximum occurring voltage with respect to the reference potential (ground) is minimized in relation to the alternative types of interconnection.

If the electrical arrangement has, for example, four fuel cell units, two fuel cell units can thus each be arranged on both sides of the reference potential, so that each two fuel cell units are provided in an electrically symmetrical interconnection relative to the reference potential. The detection of the voltage difference over the two fuel cell units connected upstream of the reference potential and the voltage difference over the two fuel cell units connected downstream of the reference potential can be carried out here by the at least two control units, which can initiate a regulation of the provided voltages of the individual fuel cell units in the event of a deviation of the detected voltage differences.

According to one embodiment, in the symmetrical interconnection, the reference potential is located on a positive voltage side of the first fuel cell unit and on a negative voltage side of the second fuel cell unit.

The symmetrical interconnection thus provides a bipolar arrangement with respect to the reference potential and differs from configurations in which the reference of the communication and control is located on the negative voltage side of all fuel cell units. In the above-described symmetrical interconnection, this is still the case for the positive voltage, but not for the negative voltage. The reference potential of the communication and control is still in relation to the ground unit there, but the connection of the power part of the fuel cell is on the positive side of the corresponding fuel cell unit. This will also be apparent in more detail in the description of the figures.

According to one embodiment, an electrical voltage on a negative voltage side of the electrical arrangement is identical to the reference potential.

This is an alternative configuration to the above-described symmetrical interconnection. In particular, the reference potential for the active parts and housings is related here to the ground unit. With this type of interconnection in the TN/TT network, the negative return line having current flow from the consumer to the fuel cell units is identical to the ground unit.

According to one embodiment, all active parts of the electrical arrangement are decoupled from the reference potential.

This is a further alternative configuration to the above-described symmetrical interconnection. The fuel cell units are also interconnected serially here, but the reference potentials are provided in the form of an IT network. Only the housings are still related to ground unit here, the active parts of the electrical arrangement are separated from the housing, that is to say electrically decoupled.

According to one embodiment, the electrical energy supply system furthermore has an electrical energy store or accumulator, which is provided in a parallel interconnection with respect to the at least two fuel cell units.

The energy store can be a capacitor, for example a supercapacitor. Ensuring a unidirectional current flow direction enables the parallel connection of such an energy store, since in this way a current flow into the fuel cell can be prevented. The parallel connection of the energy store enables a high level of system dynamics and high power peaks that can be withdrawn, which would possibly not be achievable using a fuel cell alone. In addition, a use of recuperation energy (increased symmetrical regulation dynamics of the drive even in the event of speed decrease) by the energy store is also enabled.

A recuperation can take place in aircraft applications, for example in descent, during which the so-called windmilling of the fans/propeller enables the electrical drive machines to be operated in the generator mode. A further example is the autorotation in the case of helicopters or similar aircraft, which also enables a recuperation. The electrical energy store or a further consumer, for example an additional battery, can be used to absorb the electrical recuperation energy.

By varying and regulating the operating points or operating pressures of the fuel cell, in the case of an accumulator as an energy store, its state of charge and its operating state (charging/discharging) can be controlled. These controls can also be carried out by one or more of the at least two control units.

According to one embodiment, the electrical energy supply system furthermore has a circuit or a switch, which is arranged in a parallel interconnection with respect to one fuel cell unit of the at least two fuel cell units in order to provide a current flow while bypassing the fuel cell unit.

To provide redundancy concepts or consider emergency scenarios, it is advantageous if an energy source can be used as reliably as possible. For example, the at least two fuel cell units are embodied having redundant auxiliary units, also referred to as BOP (Balance Of Plant), so that in case of fault (for example, failure of a pump), the system can be operated further. For this purpose, the fuel cell units can be provided with antiparallel current paths, for example in the form of diodes, to ensure a current flow even in the event of a failure of one fuel cell unit. The system voltage may thus be decreased, but a power withdrawal is still ensured. Continued operation of the electrical energy supply system can thus be ensured via the parallel interconnection of the switch with respect to the failed fuel cell unit.

According to one aspect of the disclosure herein, an aircraft is specified having an electrical energy supply system as described previously and hereinafter. The aircraft can be an airplane, in particular a transport airplane, or another aircraft, for example a drone or a helicopter, etc.

DETAILED DESCRIPTION

The illustrations in the figures are schematic and are not to scale. If the same reference signs are used in the following description of the figures in various figures, they designate identical or similar elements. However, identical or similar elements can also be designated by different reference signs.

Figure 1:
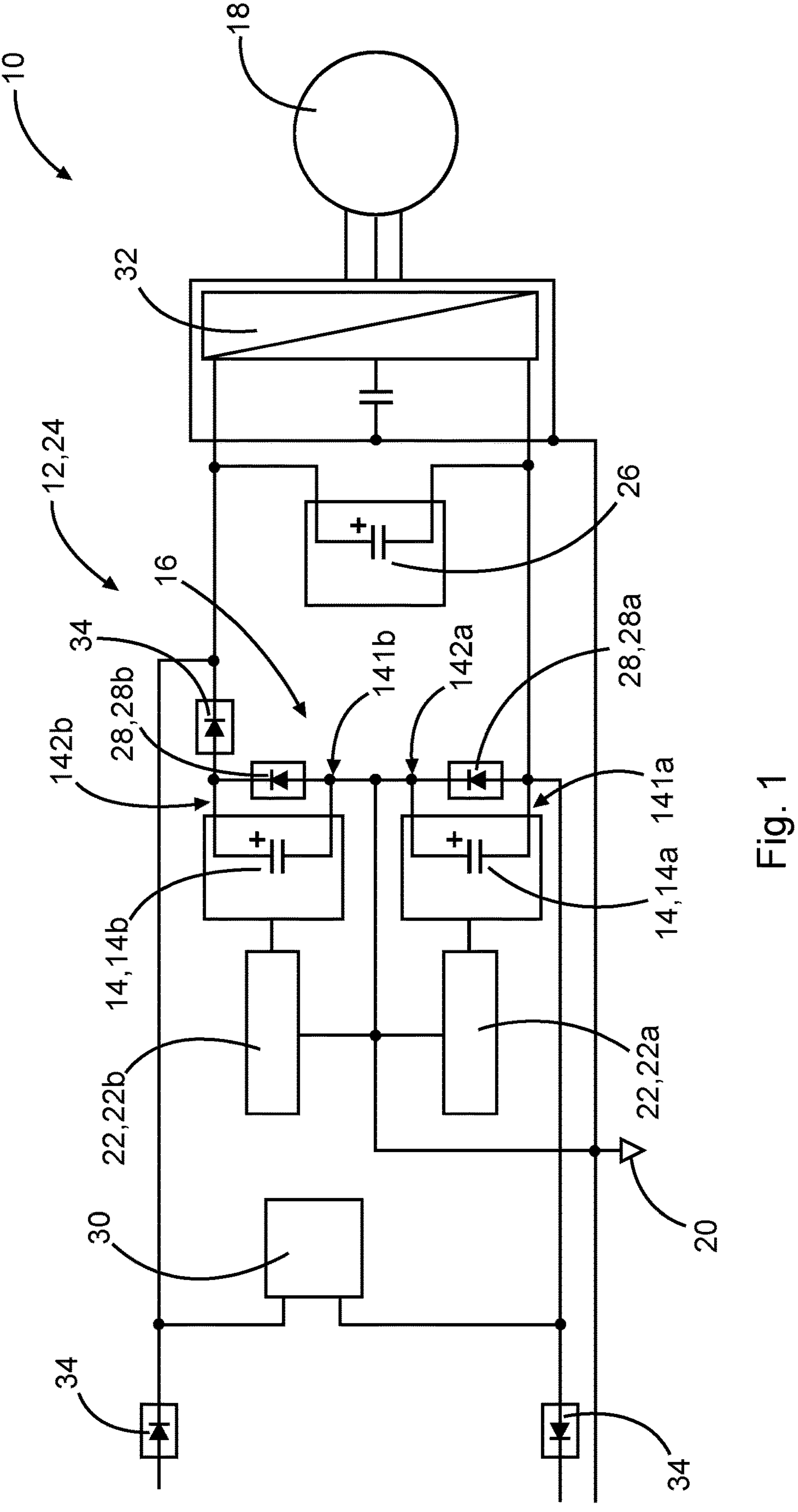
FIG. 1 shows an electrical energy supply system having fuel cell units in symmetrical interconnection with respect to a reference potential, according to one example embodiment.

FIG. 1 shows electrical energy supply system 10. The electrical energy supply system 10 comprises an electrical arrangement 12 having two fuel cell units 14, that is to say a first fuel cell unit **14*a* and a second fuel cell unit 14*b*, which are provided in an electrically serial interconnection 16 in relation to one another in the electrical arrangement 12 and provide an electrical voltage for supplying a consumer 18. The electrical energy supply system 10 also comprises a ground unit 20, which is assigned an electrical reference potential, wherein the reference potential represents, for example, a zero potential for the electrical arrangement. The electrical energy supply system 10 furthermore comprises two control units 22, that is to say a first control unit 22*a* and a second control unit 22*b*, which are each assigned to at least one of the two fuel cell units 14*a*, 14*b*, wherein each of the two control units 22*a*, 22*b* is designed to detect an electrical voltage of the assigned fuel cell unit 14*a*, 14*b* in relation to the reference potential. The first control unit 22*a* can be assigned here to the first fuel cell unit 14*a* and can detect or measure a voltage over this first fuel cell unit 14*a*. Similarly thereto, the second control unit 22*b* can be assigned to the second fuel cell unit 14*b* and can detect or measure of voltage over this second fuel cell unit 14*b*. A minimum voltage of the first fuel cell unit 14*a* is, for example, −400 V and a maximum voltage of the first fuel cell unit 14*a* is, for example, −250 V. A minimum voltage of the second fuel cell unit 14*b* is, for example, +250 V and a maximum voltage of the second fuel cell unit 14*b* is, for example, +400 V. The two control units 22*a*, 22*b* are coupled to the reference potential of the ground unit, so that an individual regulation or control of the voltages of the fuel cell units 14*a*, 14*b*** in relation to the reference potential can take place.

In the example shown in FIG. 1, the fuel cell units **14*a*, 14*b* are provided in a symmetrical interconnection 24 in relation to the ground unit 20, so that the first control unit 22*a* can detect a first voltage difference between the first fuel cell unit 14*a* and the reference potential and the second control unit 22*b* can detect a second voltage difference between the second fuel cell unit 14*b* and the reference potential. An individual regulation of the voltage over the two fuel cell units 14*a*, 14*b* can then be carried out in each case by the two assigned control units 22*a*, 22*b*. The regulation by the control units 22*a*, 22*b* can take place in such a way that the voltage over both fuel cell units 14*a*, 14*b*** is essentially equal.

In the symmetrical interconnection 24 shown in FIG. 1, the reference potential is located on a positive voltage side **142*a* of the first fuel cell unit 14*a* and on a negative voltage side 141*b* of the second fuel cell unit 14*b*. A bipolar arrangement in relation to the reference potential is therefore provided, in which the connection of the power part of the first fuel cell unit 14*a* takes place via the positive pole (shown by a "+" sign) of the first fuel cell unit 14*a* and in which the connection of the power part of the second fuel cell unit 14*b* takes place via the negative pole of the second fuel cell unit 14*b*. An operational control exactly in common of the positive and negative fuel cell units 14*a*, 14*b* in relation to the reference potential takes place here to avoid different positive and negative voltages in relation to the reference potential (ground). The control and regulation by the control units 22***a*, 22*b* can continuously monitor the voltage of the individual fuel cell units 14*a*, 14*b* for this purpose and the individual cells thereof as well as the voltage in relation to the reference potential (ground). Possible errors—also with respect to the connection in relation to the reference potential—or degradations can thus be detected early and suitable measures can be initiated.

The electrical energy supply system 10 furthermore comprises line sections, which electrically connect the components described herein of the electrical arrangement 12 to one another and form a circuit in which the consumer 18 is used for power takeoff. The consumer 18 is, for example, an electric motor of a mobile platform. In the electrical arrangement 12 shown in FIG. 1, an electrical current flow takes place from the negative voltage side 141*a* of the first fuel cell unit 14*a* to the positive voltage side 142*a* of the first fuel cell unit 14*a* and subsequently from the negative voltage side 141*b* of the second fuel cell unit 14*b* to the positive voltage side 142*b* of the second fuel cell unit 14*b*.

The electrical energy supply system 10 furthermore comprises an energy store 26, which is provided in a parallel interconnection with respect to the at least two fuel cell units 14 in the electrical arrangement 12. The parallel connection of the energy store 26 enables a high level of system dynamics and high power peaks which can be withdrawn, that go beyond the power that can be provided using the fuel cell units 14*a*, 14*b*. Recuperation energy from the consumer 18 can be absorbed in the energy store 26, when the consumer is operated in the generator mode, since recuperation energy cannot be absorbed by the fuel cell units 14*a*, 14*b*.

The provision of electrical power via the fuel cell units 14*a*, 14*b* and via the energy store 26 and the power relationships thereof can be set or regulated by the control units 22*a*, 22*b*. A state of charge of the energy store 26 and its operating state (charging/discharging) can be regulated by variation of the operating points, for example operating pressures, of the fuel cell units 14*a*, 14*b*.

The electrical energy supply system 10 furthermore comprises a circuit 28, which is arranged in a parallel interconnection with respect to one fuel cell unit 14*a*, 14*b* of the at least two fuel cell units 14, to provide a current flow while bypassing the fuel cell unit 14*a*, 14*b*. In particular, a first circuit 28*a*, for example a diode, is connected in parallel to the first fuel cell unit 14*a*, and a second circuit 28*b*, for example a further diode, is connected in parallel to the second fuel cell unit 14*b*. Due to these parallel connections, in the event of failure of one or more of the fuel cell units 14*a*, 14*b*, the operation of the entire electrical energy supply system 10 is not impaired, since the current flow is still ensured.

The electrical arrangement 12 can furthermore comprise an inverter 32, which converts a DC voltage provided by the fuel cell units 14*a*, 14*b* into an AC voltage, which is then provided to the consumer 18. Further circuits 34 or auxiliary units 30 can be provided in the electrical arrangement 12, as shown in FIG. 1.

Figure 2:
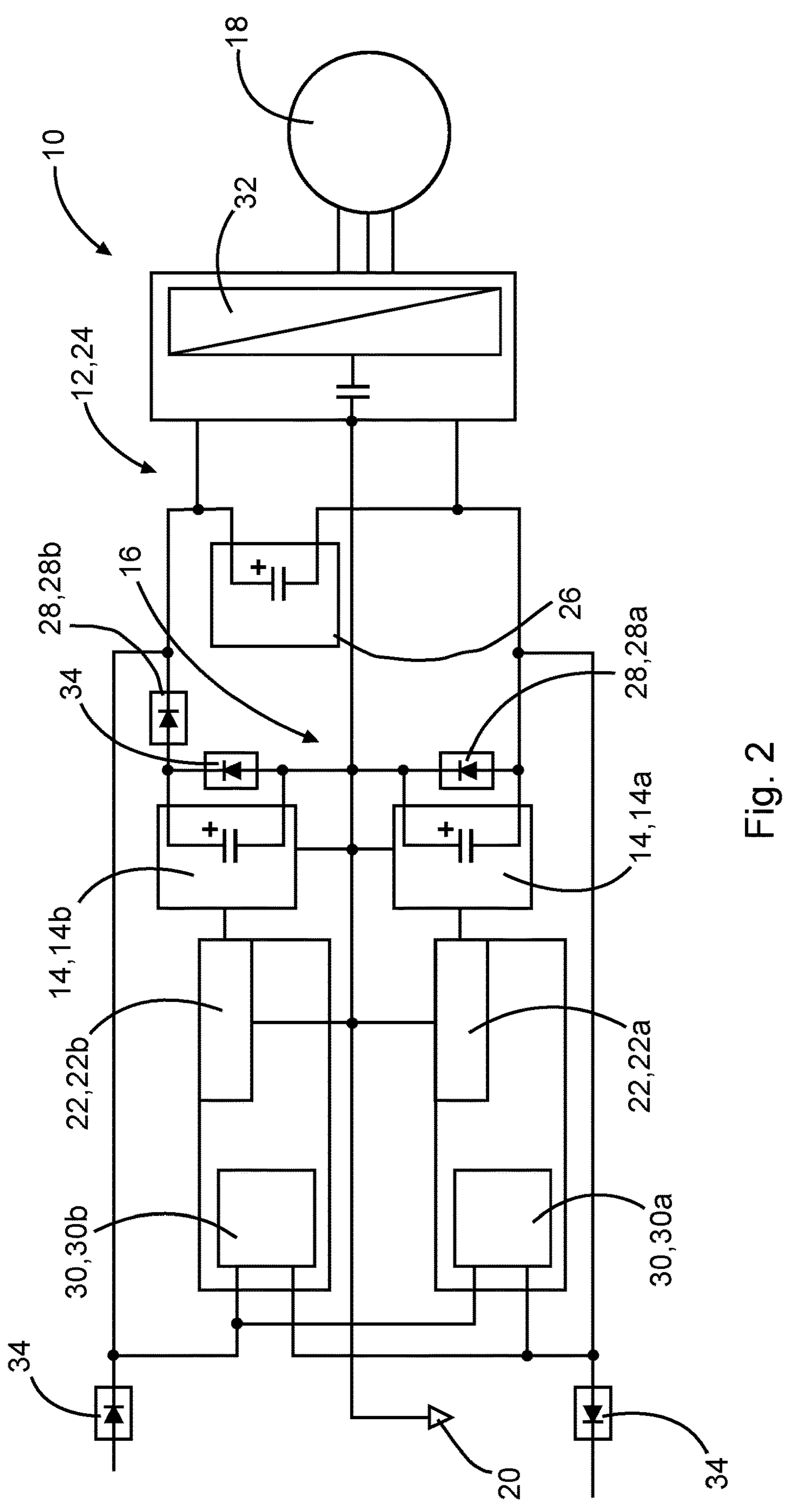
FIG. 2 shows an electrical energy supply system having fuel cell units in symmetrical interconnection with respect to a reference potential, according to a further example embodiment.

FIG. 2 shows an electrical energy supply system 10 having fuel cell units 14 in symmetrical interconnection 16 with respect to a reference potential. In principle, all interconnections and properties of the electrical arrangement 12 shown in FIG. 2 are identical here to the interconnections and properties of the electrical arrangement shown in FIG. 1, so that the description of FIG. 1 applies accordingly. In the electrical arrangement 12 shown in FIG. 2, however, furthermore a redundancy concept is shown in which furthermore two redundant auxiliary units 30*a*, 30*b* or so-called BoP (Balance of Plant) components are contained, which like the fuel cell units 14*a*, 14*b* are also in relation to the reference potential, so that the expenditure for a potential isolation of such components can be avoided. In this case, all housings of the electrical arrangement 12 are in relation to the reference potential. The reference potential in this case in the symmetrical interconnection 24 shown is still located on the positive voltage side (shown by a "+" sign) of the first fuel cell unit 14*a* and on the negative voltage side of the second fuel cell unit 14*b*. A minimum voltage of the first fuel cell unit 14*a* is, for example, −400 V and a maximum voltage of the first fuel cell unit 14*a* is, for example, −250 V. A minimum voltage of the second fuel cell unit 14*b* is, for example, +250 V and a maximum voltage of the second fuel cell unit 14*b* is, for example, +400 V. A housing comprising the first control unit 22*a* can comprise the first auxiliary unit 30*a* and a housing comprising the second control unit 22*b* can comprise the second auxiliary unit 30*b*, due to which, inter alia, potential isolations between the components are avoided.

Figure 3:
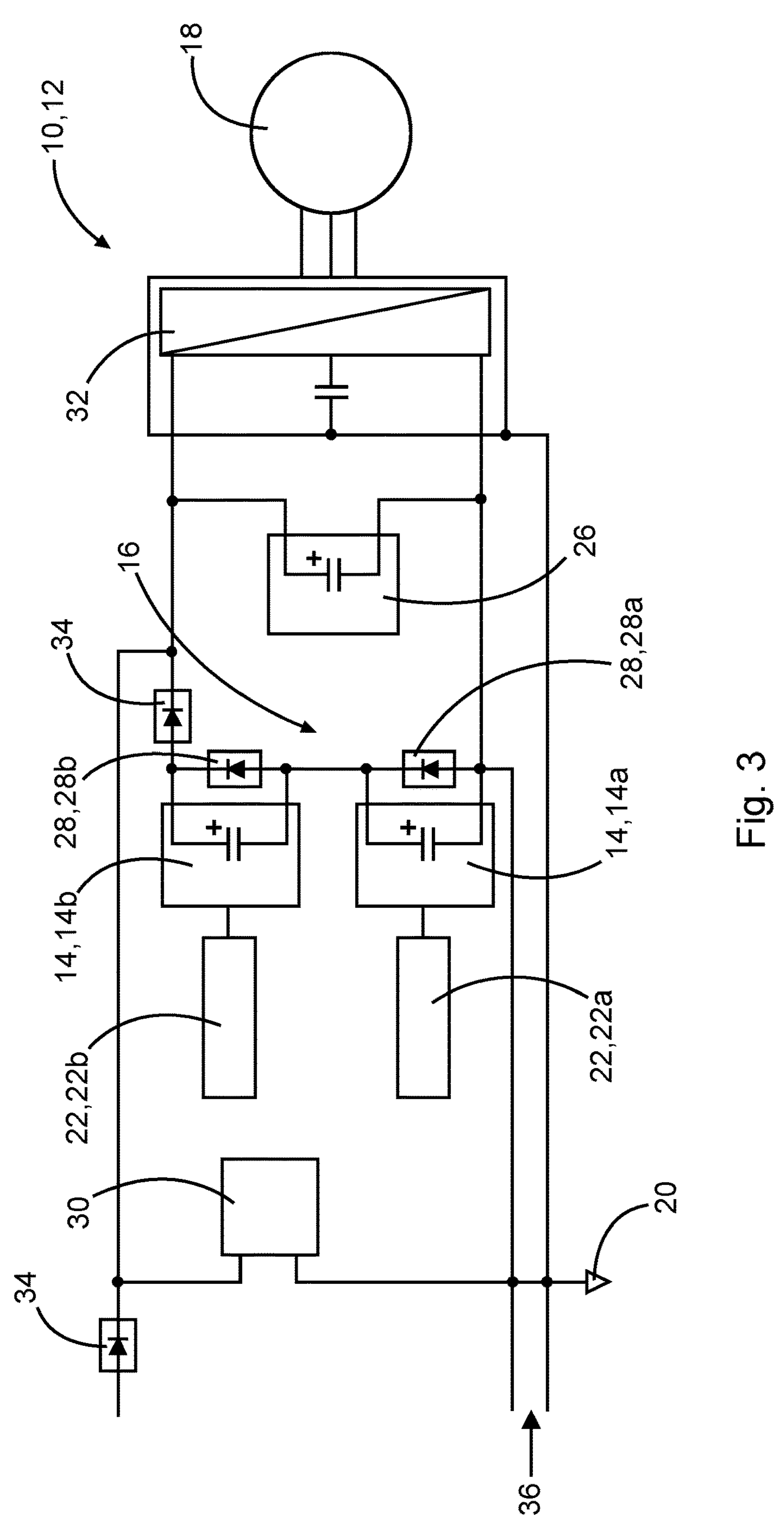
FIG. 3 shows an electrical energy supply system in which an electrical voltage on a negative voltage side of an arrangement of fuel cell units is identical to the reference potential, according to one example embodiment.

FIG. 3 shows an electrical energy supply system 10, in which an electrical voltage on a negative voltage side 36 of an arrangement of fuel cell units 14 is identical to the reference potential. A minimum voltage of the first fuel cell unit 14*a* is, for example, +250 V and a maximum voltage of the first fuel cell unit 14*a* is, for example, +400 V. A minimum voltage of the second fuel cell unit 14*b* is, for example, +250 V and a maximum voltage of the second fuel cell unit 14*b* is, for example, +400 V. The two fuel cell units 14*a*, 14*b* are furthermore connected in series and the two fuel cell units 14*a*, 14*b* are furthermore each assigned a control unit 22*a*, 22*b* for regulation, as described above, however, the reference potential is now provided, in contrast to the configurations shown in FIGS. 1 and 2, on the negative voltage side 36 of all fuel cell units 14. The ground unit 20 is therefore coupled to the negative pole of the first fuel cell unit 14*a*. The reference potential for the active parts and housings of the electrical arrangement is ground. In this type of interconnection in the TN/TT network, the negative return line from the consumer 18 to the first fuel cell 14*a* is identical to ground or is coupled to the ground unit 20. In the configuration shown in FIG. 3, higher voltages in relation to the reference potential can occur than in the configurations shown in FIGS. 1 and 2, which possibly makes larger insulation sections necessary.

Figure 4:
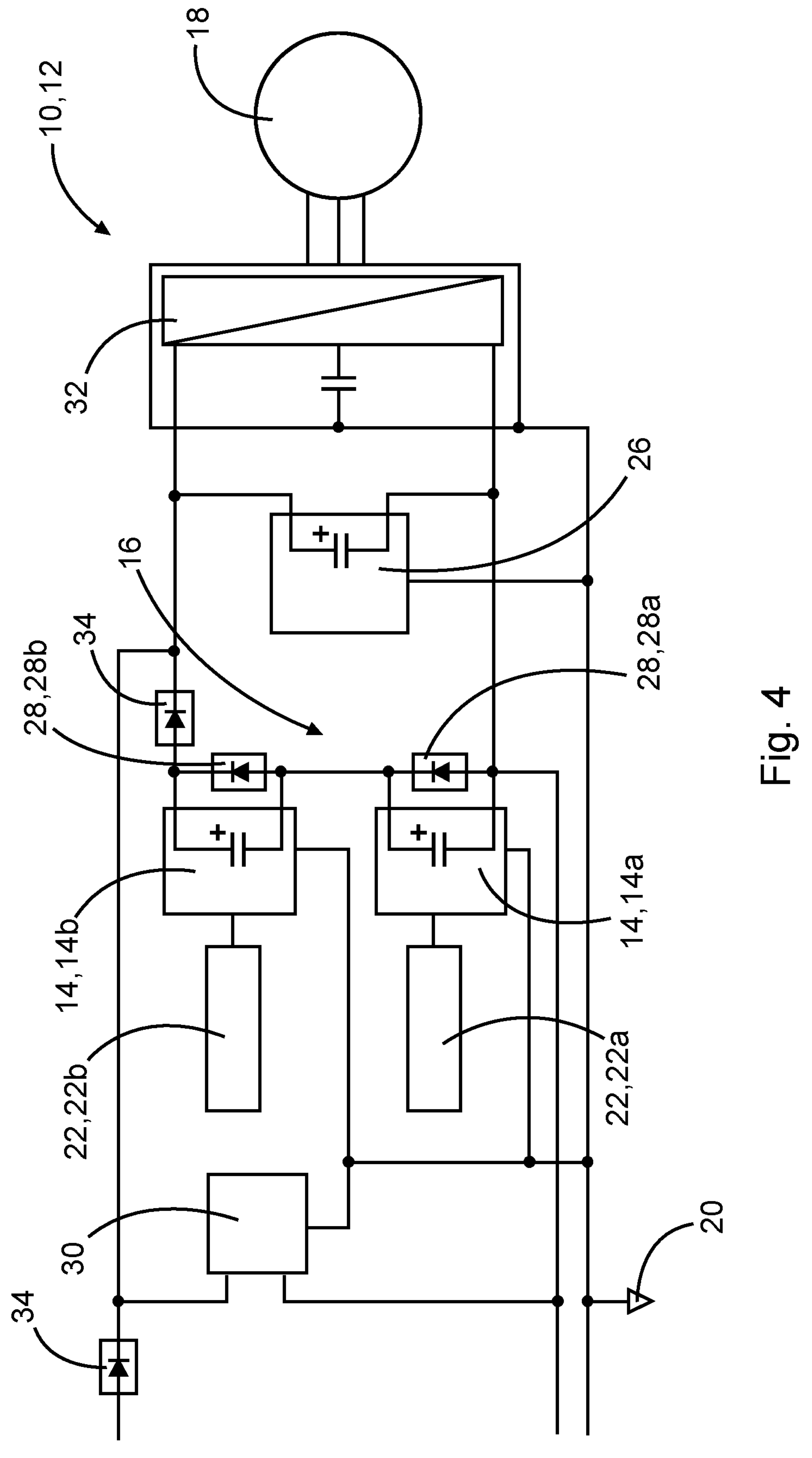
FIG. 4 shows an electrical energy supply system in which all active parts of an electrical arrangement having fuel cell units are decoupled from the reference potential, according to one example embodiment.

FIG. 4 shows an electrical energy supply system 10, in which all active parts of the electrical arrangement 12 are decoupled from the reference potential. The two fuel cell units 14*a*, 14*b* are still connected in series and the two fuel cell units 14*a*, 14*b* are furthermore each assigned a control unit 22*a*, 22*b* for regulation, as described above, however, all active components of the electrical arrangement 12 are decoupled from the reference potential. Only the housings of the individual components are in relation to the reference potential. A minimum voltage of the first fuel cell unit 14*a* here is, for example, +250 V and a maximum voltage of the first fuel cell unit 14*a* is, for example, +400 V. A minimum voltage of the second fuel cell unit 14*b* is, for example, +250 V and a maximum voltage of the second fuel cell unit 14*b* is, for example, +400 V. Such an interconnection in the form of an IT network having DC voltage has advantages since a possibly occurring asymmetry does not yet result in the failure of the system. To ensure the symmetry of the voltages of the fuel cell units 14*a*, 14*b* in relation to the reference potential and thus to keep the loads for the insulation sections as low as possible, the voltages of the fuel cell units 14*a*, 14*b* are continuously monitored and if necessary a regulation of the voltage respectively occurring over the individual fuel cell units 14*a*, 14*b* is performed.

The disclosure herein provides an electrical energy supply system 10 having a serial interconnection 16 of two or more fuel cell stacks 14*a*, 14*b* to increase the voltage for the drive in electrically driven devices. In particular, voltages of greater than 800 V can be provided here, wherein additional power electronics such as DC/DC converters can be omitted, which results, inter alia, in greater reliability of the overall system. To also keep the system weight as low as possible at given power demand, it is advantageous to dispense with power electronics, as are provided, for example, in parallel interconnections to increase the system voltage, and to provide the most direct possible power flow. In particular in the case of high power demand, a higher voltage is advantageous to keep the currents as low as possible. A possibly great usage height of the mobile platform, for example in aircraft, in which the energy supply system 10 according to the disclosure herein can be used, makes a large increase of the system voltage more difficult, however, since the insulation sections are subjected to such height influences here. The operation at low air pressure due to the high usage height requires the consideration of Paschen's law (air pressure-dependent breakdown voltage). The configuration of the electrical energy supply system 10 shown in FIGS. 1 and 2 is particularly advantageous here, since therein the maximum occurring voltage in relation to the reference potential (ground) is minimized due to the described bipolar arrangement in relation to the further configurations shown in FIGS. 3 and 4. The housings of the components used are typically in relation to the reference potential, comparable to a protective grounding, so that higher voltages in relation to the reference potential also require greater insulation sections, which can be the case in particular in the configurations shown in FIGS. 3 and 4.

Figure 5:
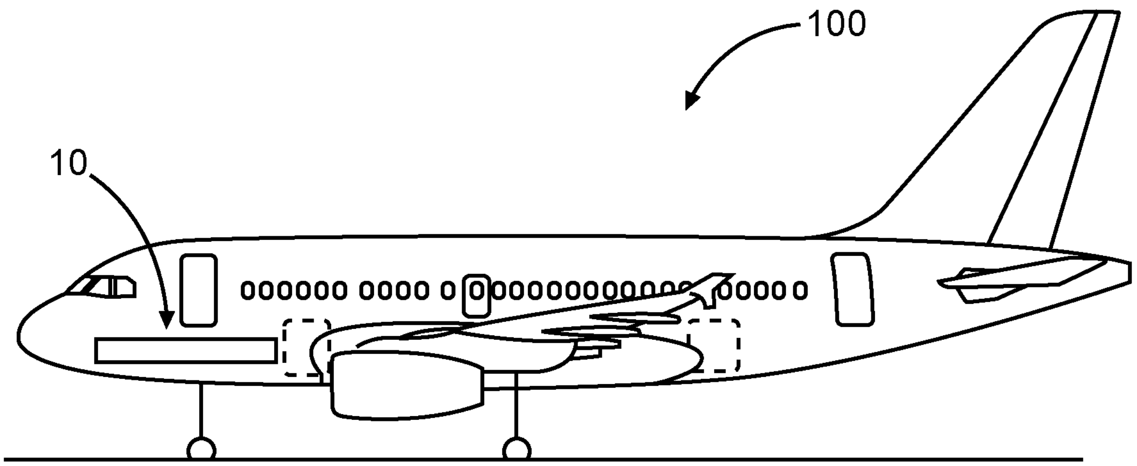
FIG. 5 shows an aircraft having an electrical energy supply system according to one example embodiment.

FIG. 5 shows a mobile platform 100 in the form of an aircraft 100, which comprises an electrical energy supply system 10 as described above.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. Reference signs in the claims are not to be viewed as a restriction. This disclosure hereby incorporates by reference the complete disclosure of any patent or application from which it claims benefit or priority.

The invention claimed is:

1. An electrical energy supply system for mobile platforms, the electrical energy supply system comprising:

an electrical arrangement having at least two fuel cells, which are in a serial interconnection in relation to one another in the electrical arrangement along a single electrical current path, such that current flowing through the electrical arrangement passes sequentially through each of the at least two cells, the at least two fuel cells being configured to provide an electrical voltage to supply at least one consumer;

a ground, which is assigned an electrical reference potential; and at least two controllers, each of which is assigned to at least one fuel cell of the at least two fuel cells, wherein each of the at least two controllers is configured to detect an electrical voltage of the at least one fuel cell to which the controller is assigned, in relation to the reference potential.

2. The electrical energy supply system of claim 1, wherein the electrical energy supply system, in addition to the at least two fuel cells, does not comprise power electronics to increase an electrical voltage provided by the at least two fuel cells.

3. The electrical energy supply system of claim 1, wherein the at least two controllers are each configured to regulate the electrical voltage of the assigned fuel cells in relation to the reference potential, so that respective electrical powers provided by the at least two fuel cells are equal.

4. The electrical energy supply system of claim 1, wherein the at least two fuel cells are in a symmetrical interconnection in relation to the ground, so that a first voltage difference between a first fuel cell of the at least two fuel cells and the reference potential is equal to a second voltage difference between a second fuel cell of the at least two fuel cells and the reference potential.

5. The electrical energy supply system of claim 4, wherein in the symmetrical interconnection, the reference potential is located on a positive voltage side of the first fuel cell and on a negative voltage side of the second fuel cell.

6. The electrical energy supply system of claim 1, wherein an electrical voltage on a negative voltage side of the electrical arrangement is identical to the reference potential.

7. The electrical energy supply system of claim 1, wherein all active parts of the electrical arrangement are decoupled from the reference potential.

8. The electrical energy supply system of claim 1, further comprising an energy store, which is in a parallel interconnection with respect to the at least two fuel cells.

9. The electrical energy supply system of claim 1, further comprising a circuit, which is in a parallel interconnection with respect to one fuel cell of the at least two fuel cells, to provide a current flow while bypassing the one fuel cell.

10. An aircraft having the electrical energy supply system of claim 1.

11. The electrical energy supply system of claim 1, wherein:

the electrical energy supply system, in addition to the at least two fuel cells, does not comprise power electronics to increase an electrical voltage provided by the at least two fuel cells;

the at least two controllers are each configured to regulate the electrical voltage of the assigned fuel cells in relation to the reference potential, so that respective electrical powers provided by the at least two fuel cells are equal;

the at least two fuel cells are in a symmetrical interconnection in relation to the ground, so that a first voltage difference between a first fuel cell of the at least two fuel cells and the reference potential is equal to a second voltage difference between a second fuel cell of the at least two fuel cells and the reference potential; and in the symmetrical interconnection, the reference potential is located on a positive voltage side of the first fuel cell and on a negative voltage side of the second fuel cell;

the electrical energy supply system further comprising:

an energy store, which is in a parallel interconnection with respect to the at least two fuel cells; and a circuit, which is in a parallel interconnection with respect to one fuel cell of the at least two fuel cells, to provide a current flow while bypassing the one fuel cell.

12. An aircraft having the electrical energy supply system of claim 11.

13. An electrical energy supply system for mobile platforms, the electrical energy supply system comprising:

an electrical arrangement having at least two fuel cells, which are electrically connected to each other in series in the electrical arrangement along a single electrical current path, such that current flowing through the electrical arrangement passes sequentially through each of the at least two cells, the at least two fuel cells being configured to provide an electrical voltage to supply at least one consumer;

a ground, which is assigned an electrical reference potential; and at least two controllers, each of which is assigned to at least one fuel cell of the at least two fuel cells, wherein each of the at least two controllers is configured to detect an electrical voltage of the at least one fuel cell to which the controller is assigned, in relation to the reference potential.

14. The electrical energy supply system of claim 13, wherein:

the electrical energy supply system, in addition to the at least two fuel cells, does not comprise power electronics to increase an electrical voltage provided by the at least two fuel cells; and/or the at least two controllers are each configured to regulate the electrical voltage of the assigned fuel cells in relation to the reference potential, so that respective electrical powers provided by the at least two fuel cells are equal.

15. The electrical energy supply system of claim 13, wherein the at least two fuel cells are in a symmetrical interconnection in relation to the ground, so that a first voltage difference between a first fuel cell of the at least two fuel cells and the reference potential is equal to a second voltage difference between a second fuel cell of the at least two fuel cells and the reference potential.

16. The electrical energy supply system of claim 15, wherein in the symmetrical interconnection, the reference potential is located on a positive voltage side of the first fuel cell and on a negative voltage side of the second fuel cell.

17. The electrical energy supply system of claim 13, further comprising:

an energy store, which is in a parallel interconnection with respect to the at least two fuel cells; and/or a circuit, which is in a parallel interconnection with respect to one fuel cell of the at least two fuel cells, to provide a current flow while bypassing the one fuel cell.

18. An aircraft having the electrical energy supply system of claim 13.

19. The electrical energy supply system of claim 13, wherein:

the electrical energy supply system, in addition to the at least two fuel cells, does not comprise power electronics to increase an electrical voltage provided by the at least two fuel cells;

the at least two controllers are each configured to regulate the electrical voltage of the assigned fuel cells in relation to the reference potential, so that respective electrical powers provided by the at least two fuel cells are equal;

the at least two fuel cells are in a symmetrical interconnection in relation to the ground, so that a first voltage difference between a first fuel cell of the at least two fuel cells and the reference potential is equal to a second voltage difference between a second fuel cell of the at least two fuel cells and the reference potential; and in the symmetrical interconnection, the reference potential is located on a positive voltage side of the first fuel cell and on a negative voltage side of the second fuel cell;

the electrical energy supply system further comprising:

an energy store, which is in a parallel interconnection with respect to the at least two fuel cells; and a circuit, which is in a parallel interconnection with respect to one fuel cell of the at least two fuel cells, to provide a current flow while bypassing the one fuel cell.

20. An aircraft having the electrical energy supply system of claim 19.

* * * * *